UNITED STATES PATENT OFFICE.

LEWELLYN L. GOODRICH, OF OMAHA, NEBRASKA.

PROCESS FOR PRESERVING UNHUSKED GREEN CORN.

1,247,261.     Specification of Letters Patent.     Patented Nov. 20, 1917.

No Drawing.     Application filed April 6, 1917. Serial No. 160,144.

*To all whom it may concern:*

Be it known that I, LEWELLYN L. GOODRICH, a citizen of the United States, residing at Omaha, in the county of Douglas and State of Nebraska, have invented certain new and useful Improvements in Processes for Preserving Unhusked Green Corn, of which the following is a specification.

This invention relates to a process for preserving unhusked green corn, and has for its object, broadly, to provide a method by means of which ears of corn in the husks may be preserved for any desired period of time and in such a manner that the flavor will not be impaired, and that no shrinkage will occur, the method also to be such that it may be practised economically and conveniently.

The advantages to be derived by use of the invention is that green corn may be supplied to the consumer during the winter months or at any time after the usual comparatively short season for green corn has closed, and in the practice of the invention ears of green corn with their husks thereon are exposed to a temperature of 28 degrees F. for 24 hours, which causes the kernels to become hardened, care being exercised when removing the ears from the stalks and at other times so that the husks will not be disarranged but will remain intact and will cover the kernels, the ears being spread out so that the exposure for the ears will be substantially uniform.

The ears of corn are then exposed to a temperature of from 4 to 6 degrees F., and are spread out on the floor or so placed that the ears are not in contact. The husks and silk at all times operate to protect the kernels from the air. The green husks and silk will become frozen and will adhere to the kernels thereafter, and any exposure of the kernels to the air will thereby be prevented.

While the method described consists of only two operations, both are necessary and may be conveniently practised. If the ears are frozen at less than 28 degrees F., which is the first operation, the kernels will become watery, and when afterward cooked it will be found that the original milk of the kernels will be separated, triturated or lumpy, and if exposed, for this operation, to a less degree of temperature than 28 degrees F., the kernels will be found to be watery, and if, for this first operation, the ears are exposed 24 hours at 30 degrees F., the kernels will wilt and shrink before becoming hardened.

If the first operation is dispensed with and the second operation alone is employed, the flavor of the green corn will be changed since the kernels will have a water content, but if the first operation is practised there will be no shrinkage of the kernels and the flavor will be preserved.

In practice, any ordinary cold storage plant may be employed for storage of the ears of corn, but the transfer from the first exposure of 28 degrees to the second exposure of 4 to 6 degrees F. should not be gradual. If frozen too slowly the kernels will shrink and wilt, and if frozen too quickly the character of the milk content of the kernels, as above mentioned, will be changed.

When it is desired to use the corn, the ears are thawed by placing them in cold water, and if the corn has been treated in accordance with the foregoing, the ears will be found to be unimpaired as to flavor or shrinkage. It will be understood, of course, that the degrees of temperature may be varied somewhat from that first given and I do not wish to be limited to exactness. It is important that the first freezing should not occur too quickly for the reason mentioned, and the temperature should be maintained at substantially 28 degrees. During the second operation, the temperature may of course be maintained at less than 4 degrees F., but this is not necessary.

With respect to the length of time the corn should be exposed to a temperature of 28 degrees F., it may exceed 24 hours somewhat, but as soon as the kernels become hardened the ears should at once be subjected to a temperature sufficiently low to cause the husks, cobs and silk to freeze solidly with the kernels, this being substantially 4 or 6 degrees F.

Having fully described my invention, what I claim and desire to secure by Letters Patent is,—

1. The herein described process of preserving ears of green corn, which consists in subjecting the ears of corn with the husks thereon for a period substantially of 24 hours to a temperature substantially of 28 degrees F., and thereafter subjecting the same to and maintaining it at a temperature substantially of 4 or 6 degrees F. until congelation of the ears is effected.

2. The herein described process of preserving green corn, which consists in exposing the ears of corn with the husks thereon not to exceed 48 hours to a degree of temperature substantially of 28 degrees F. to cause the kernels to become hardened by congelation, and thereafter subjecting the same to and maintaining it at a temperature as low or lower than 6 degrees F. until congelation of the kernels, cobs and all parts of the ears has been effected.

3. The herein described process of preserving unhusked green corn, which consists in subjecting the ears with the husks thereon while disposed in non-contact with each other to a temperature of substantially 28 degrees F. for a period substantially of 24 hours, and thereafter subjecting the ears with the husks thereon while disposed in non-contact with each other to a temperature of sufficiently low degree to cause congelation of the husks, cobs and other parts of said ears.

In testimony whereof, I have affixed my signature in presence of two witnesses.

LEWELLYN L. GOODRICH.

Witnesses:
HIRAM A. STURGES,
ARTHUR H. STURGES.

Copies of this patent may be obtained for five cents each, by addressing the "Commissioner of Patents, Washington, D. C."